US012563019B2

(12) United States Patent
Adolphe

(10) Patent No.: US 12,563,019 B2
(45) Date of Patent: Feb. 24, 2026

(54) LOW-OBSERVABLE ENCRYPTION DEVICE FOR FACILITATING COMMUNICATIONS

(71) Applicant: Forward Edge-AI, Inc., San Antonio, TX (US)

(72) Inventor: Eric Adolphe, San Antonio, TX (US)

(73) Assignee: Forward Edge-AI, Inc., San Antonio, TX (US)

( * ) Notice: Subject to any disclaimer, the term of this patent is extended or adjusted under 35 U.S.C. 154(b) by 77 days.

(21) Appl. No.: 18/464,985

(22) Filed: Sep. 11, 2023

(65) Prior Publication Data

US 2024/0364662 A1 Oct. 31, 2024

Related U.S. Application Data

(63) Continuation-in-part of application No. 18/354,387, filed on Jul. 18, 2023, and a continuation-in-part of
(Continued)

(51) Int. Cl.
*H04L 29/06* (2006.01)
*H04L 9/40* (2022.01)

(52) U.S. Cl.
CPC ...... *H04L 63/0428* (2013.01); *H04L 63/1425* (2013.01)

(58) Field of Classification Search
CPC .................................................. H04L 63/0428
See application file for complete search history.

(56) References Cited

U.S. PATENT DOCUMENTS 6,253,321 B1 6/2001 Nikander et al.
6,393,456 B1 * 5/2002 Ambler .................. G06Q 10/10
709/200

(Continued)

FOREIGN PATENT DOCUMENTS

| | | |
|---|---|---|
| CN | 203840359 U | 9/2014 |
| CN | 11315817 A | 7/2021 |
| WO | 2017058183 A1 | 4/2017 |

OTHER PUBLICATIONS

C. Hennebert and J.D. Santos, "Security Protocols and Privacy Issues into 6LoWPAN Stack: A Snthesis," in IEEE Internet of Things Journal, vol. 1, No. 5, pp. 384-398, Oct. 2014.
(Continued)

*Primary Examiner* — Jason K Gee

(74) *Attorney, Agent, or Firm* — HUNTON ANDREWS KURTH LLP

(57) ABSTRACT

A low-observable encryption device for facilitating communications includes an encryption unit for encrypting an egressing native packet received from a device to create an encrypted egressing native packet and adding a connectionless header to the encrypted egressing native packet to form an egressing connectionless datagram, a communication unit for receiving and adding a complex header to the egressing connectionless datagram for forming an egressing packet, and a computing unit for establishing a communication session between the computing unit and an external computing unit of an external encryption device, transmitting an identifier list comprising identifiers and an identifier selecting parameter to the external computing unit, and receiving and forwarding the egressing packet to the external computing unit during a time interval through a path identified by the computing unit and the external computing unit based on the identifier list and the identifier selecting parameter.

19 Claims, 16 Drawing Sheets

Related U.S. Application Data application No. 18/345,080, filed on Jun. 30, 2023, and a continuation-in-part of application No. 18/326,633, filed on May 31, 2023, and a continuation-in-part of application No. 18/309,289, filed on Apr. 28, 2023, and a continuation-in-part of application No. 18/309,323, filed on Apr. 28, 2023, now Pat. No. 12,255,995.

(56)     References Cited

U.S. PATENT DOCUMENTS

| | | | |
|---|---|---|---|
| 11,188,046 | B1 | 11/2021 | ElHattab et al. |
| 11,588,789 | B2 | 2/2023 | Kerseboom et al. |
| 11,588,798 | B1 * | 2/2023 | Cline .................. H04L 63/0272 |
| 12,088,569 | B1 | 9/2024 | Cline et al. |
| 12,199,958 | B1 | 1/2025 | Layton et al. |
| 2012/0201383 | A1 | 8/2012 | Matsuo |
| 2015/0009991 | A1 | 1/2015 | Sung et al. |
| 2018/0159765 | A1 * | 6/2018 | Shi ........................... H04L 45/74 |
| 2019/0166152 | A1 | 5/2019 | Steele et al. |
| 2021/0364645 | A1 | 11/2021 | Kim et al. |
| 2022/0272122 | A1 | 8/2022 | Kaabouch et al. |
| 2022/0385567 | A1 * | 12/2022 | Zhang ..................... H04L 45/02 |
| 2023/0095149 | A1 | 3/2023 | Nawaz |
| 2023/0138458 | A1 | 5/2023 | Wei et al. |

OTHER PUBLICATIONS

Gnanavel, S., Narayana, K. E., Jayashree, K., Nancy P., Teressa, Dawit Mamiru, Implementation of Block-Level Double Encryption Based on Machine Learning Techniques for Attack Detection and Prevention, Wireless Communications and Mobile Computing, 2022, 4255220 9 pages, Year: 2022.

M. Mushtaq et al., "Whisper: A Tool for Run-Time Detection of Side-Channel Attacks," in IEEE Access, vol. 88, pp. 83871-83900, Year: 2020.

Naeem Firdous Syed, Zubair Baig, Ahmed Ibrahim & Crag Valli (2020), Denial of Service Attack Detection Through Machine Learning for the IIT, Journal of Information and Telecommunication, 4:4, pp. 482-503, Year: 2020.

"Simple Encryption Procedure for Internet of Things (IoT) Environments," Telecommunication Standardized Sector of ITU X, 1362, obtained online from ,https://www.itu.int/rec/dologin_pub.asp?lang=e&id=T-REC-X.1362-201703-1!!!PDF-E&type=items>, retrieved on Jul. 26, 2025, Year: 2017.

Thakkar, A., Lohiya, R. A Review on Machine Learning and Deep Learning Perspectives of IDS for IoT:Recent 6 Updates, Security Issues, and Challenges. Arch Computat Methods Eng 28, 3211-3243, Year: 2021.

* cited by examiner

1102

1002

1202

LOW-OBSERVABLE ENCRYPTION DEVICE FOR FACILITATING COMMUNICATIONS

The current application is a continuation-in-part (CIP) application of the U.S. non-provisional application Ser. No. 18/309,289 filed on Apr. 28, 2023.

The current application is also a CIP application of the U.S. non-provisional application Ser. No. 18/309,323 filed on Apr. 28, 2023.

The current application is also a CIP application of the U.S. non-provisional application Ser. No. 18/326,633 filed on May 31, 2023.

The current application is also a CIP application of the U.S. non-provisional application Ser. No. 18/345,080 filed on Jun. 30, 2023.

The current application is also a CIP application of the U.S. non-provisional application Ser. No. 18/354,387 filed on Jul. 18, 2023.

FIELD OF THE INVENTION

Generally, the present disclosure relates to the field of data processing. More specifically, the present disclosure relates to a low-observable encryption device for facilitating communications.

BACKGROUND OF THE INVENTION

Existing devices for facilitating communication are deficient with regard to several aspects. For instance, current devices are prone to attacks that allow an adversary to eavesdrop on communication (data traffic) associated with the current devices. As a result, different devices are needed that render the attacks ineffective. Furthermore, current devices are geo-locatable using triangulation and trilateration. As a result, different devices are needed that obfuscate its location.

Therefore, there is a need for a low-observable encryption device for facilitating communications that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a low-observable encryption device for facilitating communications, in accordance with some embodiments. Accordingly, the low-observable encryption device may include at least one encryption unit, a communication unit, and a computing unit. Further, the at least one encryption unit may be configured for encrypting an egressing native packet received from at least one device using at least one encryption key to create an encrypted egressing native packet. Further, the at least one encryption unit may be configured for adding a connectionless header to the encrypted egressing native packet to form an egressing connectionless datagram. Further, the communication unit may be communicatively coupled with the at least one encryption unit. Further, the communication unit may be configured for receiving the egressing connectionless datagram. Further, the communication unit may be configured for adding a complex header to the egressing connectionless datagram for forming an egressing packet. Further, the computing unit may be communicatively coupled with the communication unit. Further, the computing unit may be configured for establishing at least one communication session between the computing unit and at least one external computing unit of at least one external encryption device. Further, the computing unit may be configured for transmitting at least one identifier list comprising a number of identifiers in each of the at least one identifier list, and at least one identifier selecting parameter to the at least one external computing unit. Further, each of the computing unit and the at least one external computing unit may be configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device and the at least one external encryption device. Further, the computing unit may be configured for receiving the egressing packet from the communication unit. Further, the computing unit may be configured for forwarding the egressing packet received from the communication unit to the at least one external computing unit of the at least one external encryption device through the path based on the identifying.

Further disclosed herein is a low-observable encryption device for facilitating communications, in accordance with some embodiments. Accordingly, the low-observable encryption device may include at least one encryption unit, a communication unit, a computing unit, and a beam steering antenna. Further, the at least one encryption unit may be configured for encrypting an egressing native packet received from at least one device using at least one encryption key to create an encrypted egressing native packet. Further, the at least one encryption unit may be configured for adding a connectionless header to the encrypted egressing native packet to form an egressing connectionless datagram. Further, the communication unit may be communicatively coupled with the at least one encryption unit. Further, the communication unit may be configured for receiving the egressing connectionless datagram. Further, the communication unit may be configured for adding a complex header to the egressing connectionless datagram for forming an egressing packet. Further, the computing unit may be communicatively coupled with the communication unit. Further, the computing unit may be configured for establishing at least one communication session between the computing unit and at least one external computing unit of at least one external encryption device. Further, the computing unit may be configured for transmitting at least one identifier list comprising a number of identifiers in each of the at least one identifier list, and at least one identifier selecting parameter to the at least one external computing unit. Further, each of the computing unit and the at least one external computing unit may be configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device and the at least one external encryption device. Further, the computing unit may be configured for receiving the egressing packet from the communication unit. Further, the computing unit may be configured for forwarding the egressing packet received from the communication unit to the at least one external computing unit of the at least one external encryption device through the path based on the identifying. Further, the beam steering antenna may be coupled with the computing unit. Further, the computing unit may be configured for determining a power and a transmission angle at an instance for a signal corresponding to the egressing packet. Further, the computing unit may be configured for generating at least one first value for at least one power control parameter associated with the beam steering antenna and at least one second value for at least one transmission angle parameter associated with the beam steering antenna based on the determining. Further, the beam steering antenna may be configured for broadcasting the signal with the power and the transmission angle at the instance based on the at least one first value of the at least one power control parameter and the at least one second value of the at least one transmission angle parameter. Further, the forwarding may be based on the broadcasting.

Further disclosed herein is a low-observable encryption device for facilitating communications, in accordance with some embodiments. Accordingly, the low-observable encryption device may include at least one encryption unit, a communication unit, a computing unit, and a beam steering antenna. Further, the at least one encryption unit may be configured for encrypting an egressing native packet received from at least one device using at least one encryption key to create an encrypted egressing native packet. Further, the at least one encryption unit may be configured for adding a connectionless header to the encrypted egressing native packet to form an egressing connectionless datagram. Further, the communication unit may be communicatively coupled with the at least one encryption unit. Further, the communication unit may be configured for receiving the egressing connectionless datagram. Further, the communication unit may be configured for adding a complex header to the egressing connectionless datagram for forming an egressing packet. Further, the computing unit may be communicatively coupled with the communication unit. Further, the computing unit may be configured for establishing at least one communication session between the computing unit and at least one external computing unit of at least one external encryption device. Further, the computing unit may be configured for transmitting at least one identifier list comprising a number of identifiers in each of the at least one identifier list, and at least one identifier selecting parameter to the at least one external computing unit. Further, each of the computing unit and the at least one external computing unit may be configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device and the at least one external encryption device. Further, the computing unit may be configured for receiving the egressing packet from the communication unit. Further, the computing unit may be configured for forwarding the egressing packet received from the communication unit to the at least one external computing unit of the at least one external encryption device through the path based on the identifying. Further, the computing unit may be configured for receiving an ingressing packet forwarded by the at least one external computing unit, through the path during the time interval. Further, the ingressing packet may include an encrypted ingressing native packet and a complex header. Further, the communication unit may be configured for removing the complex header from the ingressing packet received from the computing unit. Further, the communication unit may be configured for adding a connectionless header to the ingressing packet for forming an ingressing connectionless datagram. Further, the ingressing connectionless datagram may include the encrypted ingressing native packet. Further, the at least one encryption unit may be configured for receiving the ingressing connectionless datagram. Further, the at least one encryption unit may be configured for decrypting the encrypted ingressing native packet comprised in the ingressing connectionless datagram using the at least one encryption key to obtain an ingressing native packet. Further, the ingressing native packet may be transmitted to the at least one device. Further, the beam steering antenna may be coupled with the computing unit. Further, the computing unit may be configured for determining a power and a transmission angle at an instance for a signal corresponding to the egressing packet. Further, the computing unit may be configured for generating at least one first value for at least one power control parameter associated with the beam steering antenna and at least one second value for at least one transmission angle parameter associated with the beam steering antenna based on the determining. Further, the beam steering antenna may be configured for broadcasting the signal with the power and the transmission angle at the instance based on the at least one first value of the at least one power control parameter and the at least one second value of the at least one transmission angle parameter. Further, the forwarding may be based on the broadcasting.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTIONS OF THE INVENTION

Figure 1:
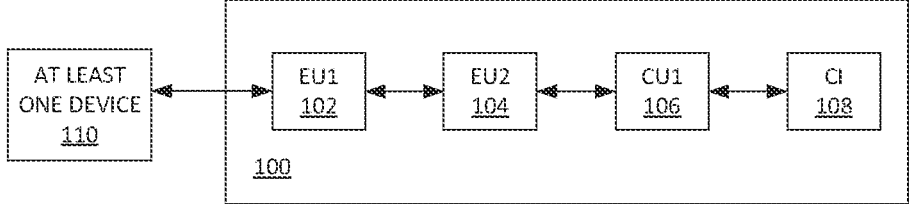
FIG. 1 is a block diagram of a low-observable encryption device 100 for facilitating communications, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a low-observable encryption device for facilitating communications, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Overview

The present disclosure describes a low-observable encryption device for facilitating communications.

Further, the disclosed low-observable encryption device implements a protocol free encryption device (PFED) (see U.S. patent application Ser. No. 17/200,468, entitled "PROTOCOL FREE ENCRYPTING DEVICE," filed Mar. 12, 2021; incorporated herein by reference). Further, the protocol free encryption device (PFED) may be implemented as an encryption retransmission device in the low-observable encryption device.

Further, the encryption retransmission device includes at least one encryption unit and a communication unit. Further, the encryption retransmission device may include galvanic isolation to isolate data and power pins between encryption units and the communication units of the encryption retransmission device to protect against attacks such as Power-Hammer. Further, the galvanic isolation is provided using a galvanic isolator. Further, the galvanic isolator includes an opto-coupler, a magneto-coupler, a piezo-couple, an opto-emulator, a transformer, a decoupling capacitor, an optoisolator, a digital isolator, a signal isolation transformer, an isolation amplifier, a signal transfer device having a transmitter and a receiver that are electrically isolated from one another and exchange signals such as optical, radio, ultrasound signals, etc. Further, the encryption retransmission device may include a resin enclosure comprised of a resin, such as an epoxy resin, and encloses the encryption retransmission device. The resin absorbs heat therefore the resin enclosure does not radiate the heat. Further, the encryption retransmission device may include a network interface module (NIM) that on-boards all communication interfaces onto a PCB (printed circuit board) comprising the encryption units and communication units, connecting through the communication units to maintain a protocol break (see, U.S. patent application Ser. No. 17/200,468, entitled "PROTOCOL FREE ENCRYPTING DEVICE," filed Mar. 12, 2021; incorporated herein by reference), thus allowing for wireless communications. Further, the encryption units and the communication units are computing devices. Further, the PCB is encased in resin to prevent tampering and protect against BitWhisper (heat emission) attacks. Further, the encryption retransmission device may also include an Anomaly Detector (AD) (or anti-tamper) that uses three different algorithms acting independently to detect anomalies that may signal an attack. The algorithms of the AD use multi-variant signal analysis. Further, the AD is capable of warning an operator and also executing an "immune system" type of response. Further, the encryption retransmission device may also include an inner case (Faraday Cage) to limit the leaking of radio signals from the encryption retransmission device, and further prevent access by an attacker. Further, the encryption retransmission device may also include a custom resin/plastic outer case to allow integration into multiple use cases. Further, the encryption retransmission device also provides a Four-hour backup battery operation. Further, the inner cage of the encryption retransmission device may be Extruded Aluminum Inner Case that houses the PCB and acts as a Faraday cage. Further, the anomaly detector may include a Raspberry Pi4 loaded with a software application. Further, a case of the anomaly detector is designed to be interlocked with the outer case of the encryption retransmission device (Isidore device) forming an Isidore Quantum device. Further, the encryption retransmission device (Isidore device) includes an embedded software application. Further, the anomaly detector may include multiple models such as Azure Anomaly Detector, Anomaly-Transformer, Anomaly Autoencoder, GLocalKD, STL, and RDP. Each AD will have three different models working independently to detect anomalies. An aggregator determines an attack based on the outputs of the three models. Further, the models are randomly installed on each AD. Further, the PFED incorporated in the disclosed system may be an encrypting device. Further, two encrypting devices are paired to provide communications between two trusted elements via an untrusted network. Further, any device in a network address space may be a trusted element. Further, the network address space may be a subnet in an enterprise network. Further, the device may include a smartphone, a tablet, a laptop, a desktop, a router, etc. are examples of devices in a network address space.

Further, each of the trusted elements, includes an interface, for receiving a trusted interconnect, providing a wired connection between the two encrypting devices, and the trusted element, thereby providing communications between the trusted element and the encrypting device. Further, the encrypting devices are associated with the trusted elements via trusted interconnects. Further, the two encrypting devices need to be paired to allow communication between the trusted elements.

Each sending trusted element generates native packets to be received by another trusted element. Further, the native packets may take any form that would allow the native packets to normally travel between the trusted elements without encrypting devices. Further, the native packets may include a data packet riding in a frame, an IP packet riding in an Ethernet frame, etc. Further, each of the encrypting devices may include an encryption unit and a communication unit linked to the encryption unit via a connectionless interconnect provided by a bus. The connectionless interconnect utilizes a point-to-point connectionless protocol for the transmission of messages between the encryption unit and the communication unit. This point-to-point connectionless interconnect simply sends messages between the encryption unit and the communication unit. No arrangement (such as a handshake) is made between the encryption unit and the communication unit before messages are sent; Each encryption unit is configured with a key for encrypting and decrypting messages. For trusted elements to communicate, the encryption unit's keys of the two encrypting devices must match.

The encryption devices include interfaces and a one-way interface. Each interface may include an Ethernet port, a serial port, or a USB port. Further, the interfaces may be in communication with the trusted element interface of the trusted element via the trusted interconnect, e.g., an Ethernet cable, a serial wire, or a USB cable. Further, the interfaces are not associated with an address. The interfaces are not addressable and therefore, the messages are treated strictly as data, not as network packets before processing by the encryption unit.

The one-way interface may include a GPIO pin, a twisted pair wire, etc. The one-way interface allows for instructions generated by the encryption unit to be signaled to the communication unit. Further, the instructions may instruct the communication unit to halt operations.

Further, the passive interface and an active/addressable interface are both included in each communication unit. Through the connectionless interconnection, the passive interface of the communication unit of one encrypting device is in contact with the second passive interface of the encryption unit of the other encrypting device. The address is linked to the active/addressable interface. To transmit any packets from the passive interface into a form that will be routable to the other communication unit of the paired PFED, the communication unit of one encrypting device is paired with the communication unit of the other encrypting device. The Internet or other untrusted networks are used for communications between communication units. Further, the native packet is also created by one trusted element and sent to the other as part of the communications between the trusted elements. The native packet could be an Ethernet frame, for instance, and could have a frame header containing the source and destination addresses. Through the trusted interconnect and the encryption unit's interface, the native packet is sent to the other encryption unit of the other encrypting device. The encryption unit ingests the entire native pack (including the frame header and the payload) when it receives the native packet and encrypts the entire native packet using the encryption key. To create an outgoing connectionless datagram, the encryption unit additionally adds a connectionless header to the encrypted native packet. An atomic, stateless datagram is the connectionless datagram.

Fields indicating message boundaries (such as length, character count, size, etc.) or other static properties of the message may be included in the connectionless header. Using pre-established criteria connected to the fields of the connectionless header, the receiver is free to accept or reject a frame regardless of the connectionless datagram's contents. The connectionless header may also contain fields like the length. The maximum length of the frame that the receiver (i.e., the encryption unit or the communication unit) will accept may be bound by a pre-specified constant. The receiver may safely discard the connectionless datagram if its size exceeds the predetermined maximum length, as determined by the receiver. The connectionless header does not contain any dynamic properties, so the receiver can process a frame without keeping track of any previous state data. This greatly simplifies the logic and state machine needed by the receiver to correctly process the connectionless header. Human inspection is capable of reaching a known termination in each state. The ability to assess the security boundary logic for certification and correctness is significantly improved as a result.

The untrusted network can comprehend the intricate header, which permits the delivery of the packet to the paired communication unit. The complex header, for instance, contains both a source address and a destination address. Dynamically defined fields may also be present in the complex header. In order to deliver the packet to the paired communication unit (the communication unit of the encrypting device), the untrusted network routes the packet as necessary. A connectionless header is added to the connectionless datagram to create an incoming connectionless datagram after the communication unit of the encrypting device removes the complex header added by the communication unit and receives the packet. The connectionless header may have fields indicating message boundaries (such as length) or other static properties of the message, as previously mentioned.

A trust boundary between the trusted environment (trusted network) and the untrusted environment (untrusted network) is created by the encryption device pair, which offers a cryptographically paired, point-to-point link that enforces logical and physical isolation. By placing independent devices at the endpoints of the connectionless interconnect (i.e., the communication unit and the encryption unit), the physical isolation is achieved. The communication unit handles the intricate native untrusted network processing independently from the encryption unit's straightforward connectionless network processing. By converting the untrusted native packet sent to the active/addressable interface into a connectionless packet, the logical isolation is achieved. The native packet is always encrypted before it passes from the trusted element to the communication unit and is cryptographically authenticated by the encryption unit of the paired encrypting device before it is allowed to pass to the trusted element.

An entity situated on the communication unit side of the connectionless-interconnect cannot create a packet that has meaning for the trusted element unless the key is known to that entity since all packets arriving at the trusted element must be received via the encryption unit. An encrypting device pair, or encrypting device pair, establishes a tunnel across the untrusted network to connect two devices in trusted spaces via a virtual wire through untrusted spaces. The environments that are trusted and untrusted are totally separate from one another. No information is shared about the other. This is meant by "protocol-free". Networking and encryption "protocols" are separate from one another. Additionally, the encryption units are set up to send inter-PFED control messages so they can communicate with one another.

The cryptographic state of the encryption units is managed by means of these inter-PFED control messages. In order to rekey, manage the cryptographic algorithm, manage the status of the encryption units (e.g., log, online/offline, etc.), start a new session, etc., the PFED's encryption unit may also generate an inter-PFED control message for delivery to the PFED's encryption unit. These inter-PFED control messages are packetized as connectionless packets and travel along the same PFED-to-PFED tunnel as the native packets originating at the trusted element, but they are identified as control messages. They originated at the encryption unit, encrypted by the encryption unit using a key, packetized, and sent along the PFED-to-PFED tunnel. The inter-PFED control messages are not sent to the trusted element because they are marked as control messages.

Further, the present disclosure describes a low-observable encryption device for a smartphone. Further, the low-observable encryption device encrypts communications associated with the low-observable encryption device in a way that cannot be broken even via a quantum computer. Further, the low-observable encryption device prevents the detection of the encrypted traffic associated with the low-observable encryption device. Further, the low-observable encryption device obfuscates its location.

Further, the low-observable encryption device may include encryption units and a communication unit. Further, the low-observable encryption device may include a compute infrastructure (CI) connected to the communication unit. Further, the CI includes a static list of N (e.g., 100,000) MEID numbers, a static list of N (e.g., 100,000) MAC numbers, a static list of N (e.g., 1,000) UDP port numbers, etc. Further, the low-observable encryption device and an external encryption device (such as an Isidore quantum device, an encryption retransmission device, an external low-observable encryption device, etc.) establish an SSL session and exchange 100 MEID, 100 MAC, and 100 ports during the initial setup between the low-observable encryption device and the external encryption device. Further, the low-observable encryption device and the external encryption device have knowledge of the MEID, MAC, and UDP ports selected. After a specified time interval, the CI in the low-observable encryption device and the external encryption device (e.g., every 20 mins), will transition to the next MEID, MAC, and UDP Port combination on the agreed list. Further, this regular transition gives an appearance of different devices connecting to the network to someone trying to eavesdrop on the communications associated with the low-observable encryption device and the external encryption device. Further, this transition renders an attack initiated on a specific UDP port (e.g., UDP port X) ineffective because the low-observable encryption device and the external encryption device would switch to UDP Port Y before the attack is completed. Further, the CI also adds basic HTML5 headers and MIME declarations to embed the encrypted payload (packets) from the CU1 (communication unit). This addition makes the packet resemble normal web traffic and does not raise suspicion for an adversary that may inspect the packets. The technique of making the packet resemble normal web traffic would also defeat methods used to detect a VPN. Further, the CI includes Anomaly Detector (AD) software to learn the patterns of life associated with the low-observable encryption device. For example, if a large number of packets is dropped by CU1, the AD detects this event and initiates the next interval (second bullet) for the communications as an immune response.

Further, the low-observable encryption device may include a beam steering antenna (BSA) or a beam forming antenna connected to the CI. Further, the BSA may include a beam forming phase array on a metal case. Further, the beam forming phase array may be integrated into the metal case. Further, the metal case houses a PCB board comprising the encryption units (EU1 and EU2), the communication unit (CU1), and the compute infrastructure (CI). Further, the PCB board is electrically connected to the metal case. Further, the metal case comprising the beam forming phase array forms the BSA. The printed circuit board connects to the metal case which is the antenna via a cable. Further, the metal case is housed in an outer resin case. Further, the BSA and CI integrate with the Isidore Quantum device or Isidore device for forming the low-observable encryption device. Further, the CI (a SoC) includes software that alters the power and angle of the broadcast using the beam forming antenna to defeat triangulation and trilateration used to geolocate a device (such as a smartphone) on a cellphone network. By alternating the signal power and angle of transmission, the device would appear 500 meters away from the device's actual location and in motion. Further, the "speed of motion" of the device can be controlled by a rate of signal and power change. Further, the low-observable encryption device creates a solution that is very difficult to detect, geo-track, and intercept. The encryption provided by the low-observable encryption device is quantum resistant, so even if the communications of the low-observable encryption device can be detected and intercepted they cannot be decrypted, even with a super computer.

Further, the BSA may facilitate low-probability-of-intercept (LPI) or low-probability-of-detect (LPD) communications using the beamforming phase arrays with rapid side lobe time modulation (SLTM). Further, the beamforming phase arrays provide time-varying side-lobes while maintaining a fixed main-lobe pattern. Further, the signal radiated through the main-lobe of the aperture will not be distorted but the signal radiated through its side lobes will be irrecoverably scrambled in a manner similar to spread spectrum communications. Further, the beamforming phase arrays may be a plurality of antenna elements. Further, a phase of one antenna element is sequentially inverted to generate a plurality of modes corresponding to the plurality of antenna elements and another element with the inversed phase combines with its symmetrical element forming a pair of elements. Further, the fields of the pair elements cancel out in the broadside direction and influence the undesired (side-lobe) direction, therefore these pair of elements change the total field in the undesired directions and keep the main lobe unaltered.

FIG. 1 is a block diagram of a low-observable encryption device 100 for facilitating communications, in accordance with some embodiments. Accordingly, the low-observable encryption device 100 may include at least one encryption unit 102-104, a communication unit 106, and a computing unit 108. Further, the communication may be low-observable communications.

Further, the at least one encryption unit (such as an encryption unit 1 (EU1) 102 and an encryption unit 2 (EU2) 104) 102-104 may be configured for encrypting an egressing native packet received from at least one device 110 using at least one encryption key to create an encrypted egressing native packet. Further, the at least one device 110 may include a user device (such as a smartphone, a tablet, a laptop, a desktop, etc.), a client device, etc. Further, the at least one device 110 may be a trusted element. Further, the at least one device 110 may generate the egressing native packet which is a data packet. Further, the at least one encryption unit 102-104 may be configured for adding a connectionless header to the encrypted egressing native packet to form an egressing connectionless datagram. Further, the at least one encryption unit 102-104 may include a computing device, a System on Chip (SoC), etc.

Further, the communication unit (such as a communication unit 1 (CU1)) 106 may be communicatively coupled with the at least one encryption unit 102-104. Further, the communication unit 106 may be configured for receiving the egressing connectionless datagram. Further, the communication unit 106 may be configured for adding a complex header to the egressing connectionless datagram for forming an egressing packet. Further, the communication unit 106 may include a computing device, a System on Chip (SoC), etc.

Figure 2:
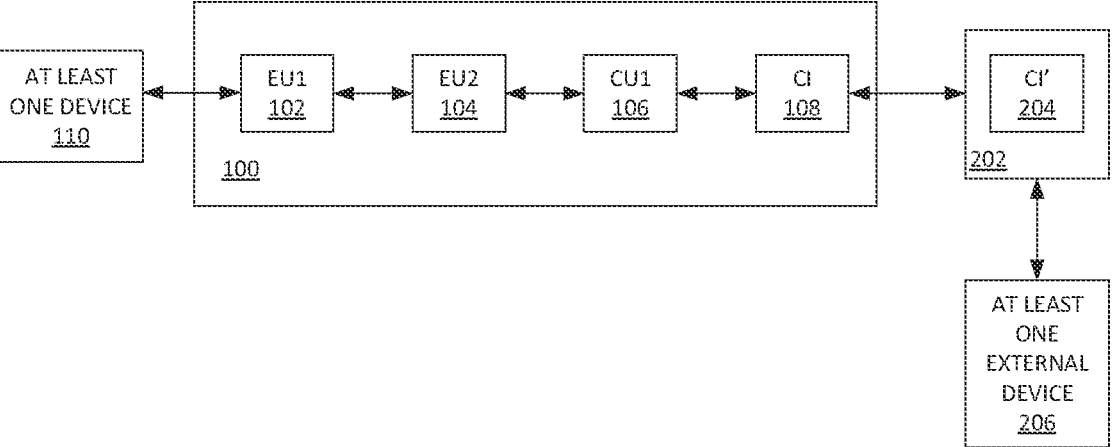
FIG. 2 is a block diagram of the low-observable encryption device 100 with the at least one encryption device, in accordance with some embodiments.
Figure 3:
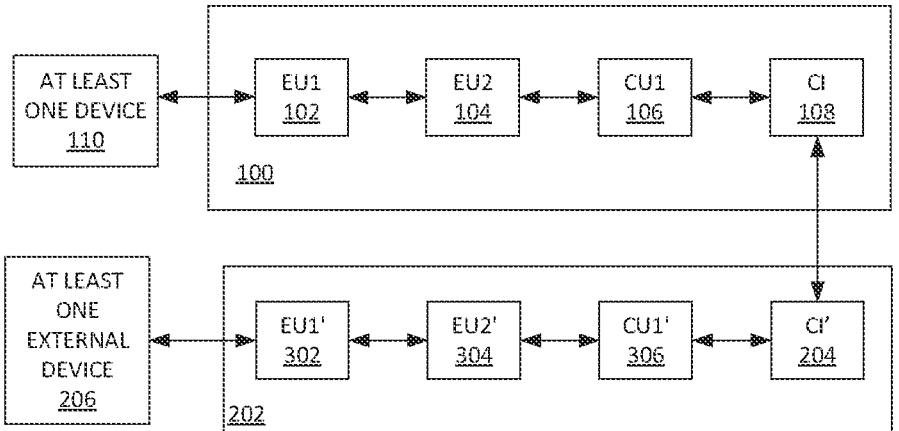
FIG. 3 is a block diagram of the low-observable encryption device 100 with the at least one encryption device, in accordance with some embodiments.

Further, the computing unit 108 may be communicatively coupled with the communication unit 106. Further, the computing unit 108 may be a compute infrastructure (CI). Further, the computing unit 108 may be configured for establishing at least one communication session between the computing unit 108 and at least one external computing unit 204 of at least one external encryption device 202, as shown in FIG. 2. Further, the at least one external computing unit 204 may be an external compute infrastructure (CI'). Further, the at least one communication session may include a Secure Sockets Layer (SSL) session. Further, the computing unit 108 may be configured for transmitting at least one identifier list comprising a number of identifiers in each of the at least one identifier list, and at least one identifier selecting parameter to the at least one external computing unit 204. Further, each of the computing unit 108 and the at least one external computing unit 204 may be configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device 100 and the at least one external encryption device 202. Further, the communicating of the packets (such as the ingressing packet, the egressing packet, etc.) forms a traffic of the low-observable encryption device 100. Further, the transmitting of the at least one identifier list comprising the number of identifiers in each of the at least one identifier list, and the at least one identifier selecting parameter to the at least one external computing unit 204 allows the low-observable encryption device 100 and the at least one external encryption device 202 to exchange the at least one identifier list comprising the number of identifiers in each of the at least one identifier list, and the at least one identifier selecting parameter. Further, the at least one identifier list may include a list of mobile equipment identifier (MEID) numbers, a list of media access control (MAC) numbers, a list of user datagram protocol (UDP) port numbers, etc. Further, the number of identifiers may be 100. Further, the at least one identifier selecting parameter may be associated with at least one value that dictates the selecting of the identifier from the number of identifiers comprised in each of the at least one identifier list. Further, the computing unit 108 may be configured for receiving the egressing packet from the communication unit 106. Further, the computing unit 108 may be configured for forwarding the egressing packet received from the communication unit 106 to the at least one external computing unit 204 of the at least one external encryption device 202 through the path based on the identifying. Further, the path corresponds to a specific routing and directing of the egressing packet for the forwarding of the egressing packet. Further, the time interval may include a twenty-minute interval. Further, the at least one external encryption device 202 may be communicatively coupled with at least one external device 206 as shown in FIG. 2. Further, the at least one external encryption device 202 may include an Isidore device, an Isidore quantum device, a low-observable encryption device, etc. Further, the at least one external device 206 may include a smartphone, a tablet, a laptop, a desktop, etc., a client device, etc. Further, the at least one external device 206 may be an untrusted element. Further, the at least one external encryption device 202 decrypts the egressing packet to obtain the egressing native packet and transmits the egressing native packet to the at least one the at least one external device 206 for facilitating the communications. Further, in an embodiment, the at least one external encryption device 202 may include an external communication unit (CU1') 306 communicatively coupled with the external compute infrastructure (CI') 204 and at least one external encryption unit (an external encryption unit 1 (EU1') 302 and an external encryption unit 2 (EU2') 304) 302-304 communicatively coupled with the external communication unit 306, as shown in FIG. 3. Further, the at least one external device 206 may be communicatively coupled with the at least one external encryption unit 302-304.

Further, in some embodiments, the computing unit 108 may be configured for receiving an ingressing packet forwarded by the at least one external computing unit 204, through the path during the time interval. Further, the ingressing packet may include an encrypted ingressing native packet and a complex header. Further, the communication unit 106 may be configured for removing the complex header from the ingressing packet received from the computing unit 108. Further, the communication unit 106 may be configured for adding a connectionless header to the ingressing packet for forming an ingressing connectionless datagram. Further, the ingressing connectionless datagram may include the encrypted ingressing native packet. Further, the at least one encryption unit 102-104 may be configured for receiving the ingressing connectionless datagram. Further, the at least one encryption unit 102-104 may be configured for decrypting the encrypted ingressing native packet comprised in the ingressing connectionless datagram using the at least one encryption key to obtain an ingressing native packet. Further, the ingressing native packet may be transmitted to the at least one device 110. Further, the at least one external device 206 may generate the ingressing native packet. Further, the at least one external encryption device 202 may form the ingressing packet from the ingressing native packet.

Figure 4:
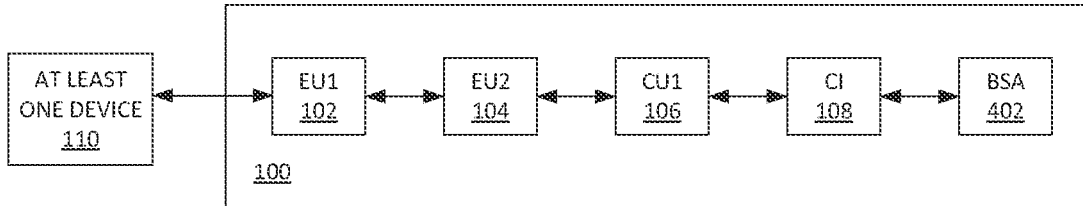
FIG. 4 is a block diagram of the low-observable encryption device 100 comprising the beam steering antenna 402, in accordance with some embodiments.

In further embodiments, the low-observable encryption device 100 may include a beam steering antenna 402, as shown in FIG. 4, coupled with the computing unit 108. Further, the beam steering antenna 402 may be connected to the computing unit 108 by physically connecting the beam steering antenna 402 to the computing unit 108, externally attaching the beam steering antenna 402 to the computing unit 108, and embedding the beam steering antenna 402 into the computing unit 108, etc. Further, the beam steering antenna 402 Further, the beam steering antenna 402 may include a beam forming antenna. Further, the computing unit 108 may be configured for determining a power and a transmission angle at an instance for a signal corresponding to the egressing packet. Further, the determining of the power and the transmission angle is based on analyzing at least one information associated with a communication of the packets during the time interval. Further, the computing unit 108 stores the at least one information. Further, the signal may include a radiofrequency (RF) signal. Further, the computing unit 108 may include a modem unit for converting the egressing packet into the radio frequency signal by performing one or more modulations on the egressing packet. Further, the computing unit 108 may be configured for generating at least one first value for at least one power control parameter associated with the beam steering antenna 402 and at least one second value for at least one transmission angle parameter associated with the beam steering antenna 402 based on the determining. Further, the power and the transmission angle may be varied based on the at least one first value of the at least one power control parameter and the at least one second value of the at least one transmission angle parameter. Further, the beam steering antenna 402 may be configured for broadcasting the signal with the power and the transmission angle at the instance based on the at least one first value of the at least one power control parameter and the at least one second value of the at least one transmission angle parameter. Further, the broadcasting may include radiating electromagnetic waves corresponding to the signal. Further, the forwarding may be based on the broadcasting. Further, the power corresponds to a gain of the signal and the transmission angle corresponds to a beam direction or beam steering of the signal. Further, the gain and the beam direction characterize the signal. Further, the beam steering antenna 402 may include an array of antenna elements. Further, each of the array of antenna elements may include a power amplifier and a phase shifter. Further, the power amplifier adjusts an amplitude of a signal corresponding to each of the array of antenna elements based on the at least one first value and the phase shifter adjusts a phase of a signal corresponding to each of the array of antenna elements based on the at least one second value. Further, the signal may include a plurality of signals comprising the signal corresponding to each of the array of antenna elements for a plurality of antenna elements in the array of antenna elements.

Further, in an embodiment, the computing unit 108 may be configured for obtaining at least one location obfuscating information. Further, the computing unit 108 stores the at least one location obfuscating information associated with an obfuscating of a location (geolocation) of the low-observable encryption device 100. Further, the computing unit 108 may be configured for analyzing the at least one location obfuscating information. Further, the computing unit 108 may be configured for determining at least one location obfuscating requirement for the low-observable encryption device 100 based on the analyzing of the at least one location obfuscating information. Further, the determining of the power and the transmission angle at the instance may be based on the at least one location obfuscating requirement.

Further, in some embodiments, the plurality of paths corresponds to a combination of the identifier from the number of identifiers from each of the at least one identifier list. Further, each of the plurality of paths may be unique.

Further, in some embodiments, the computing unit 108 may be configured for adding at least one of a header and a declaration associated with at least one internet standard to the egressing packet for embedding the egressing packet. Further, the forwarding of the egressing packet may be based on the embedding. Further, the at least one internet standard may include HyperText Markup Language (HTML), Multipurpose Internet Mail Extensions (MIME), etc. Further, the header may include HTML5. Further, the declaration may include an MIME declaration.

Further, in some embodiments, the computing unit 108 may be configured for initiating a next time interval. Further, the initiating of the next time interval terminates the time interval. Further, the computing unit 108 may be configured for selecting a next identifier from the number of identifiers comprised in each of the at least one identifier list for identifying a next path from the plurality of paths for the next time interval succeeding the time interval based on the at least one identifier list and the at least one identifier selecting parameter for the communicating of packets during the next time interval between the low-observable encryption device 100 and the at least one external encryption device 202. Further, the next path may differ from the path.

Further, in some embodiments, the computing unit 108 may be configured for generating at least one packet information associated with the egressing packet based on the receiving of the egressing packet. Further, the at least one packet information may include a number of packets transmitted by the communication unit 106 to the computing unit 108 during at least one duration. Further, the receiving of the egressing packet by the computing unit 108 corresponds to a behavior of the low-observable encryption device 100. Further, the computing unit 108 may be configured for analyzing the at least one packet information using at least one machine learning model. Further, the at least one machine learning model may be trained on a plurality of historical packet information associated with a plurality of historical egressing packets received by the computing unit 108 from the communication unit 106 for learning a pattern of life for the low-observable encryption device 100. Further, the pattern of life corresponds to a normal behavior of the low-observable encryption device 100 wherein the at least one machine learning model may be configured for detecting an anomaly in the behavior in relation to the normal behavior. Further, the initiating of the next time interval may be based on the detecting of the anomaly. Further, the at least one machine learning model may be an unsupervised machine learning model comprised of a convolution neural network, a recurrent neural network, a support vector machine, etc. Further, the at least one machine learning model may be trained using at least one algorithm of an anomaly detector (AD). Further, the computing unit 108 may include the anomaly detector.

Further, in some embodiments, the computing unit 108 may be a System on Chip (SoC). Further, the SoC may include a processing unit, a memory, input and output ports, peripheral interfaces, secondary storage devices, modems, a timing device, etc.

Further, in some embodiments, the at least one encryption unit 102-104 may include two encryption units. Further, the two encryption units may include the encryption unit 1 (EU1) 102 and the encryption unit 2 (EU2) 104. Further, the two encryption units may be communicatively coupled.

Further, in some embodiments, the at least one encryption unit 102-104 may be communicatively coupled to the communication via a one-way connection for providing at least one instruction to the communication unit 106.

Further, in some embodiments, the computing unit 108 may be configured for storing a plurality of identifier lists. Further, the plurality of identifier lists may include the at least one identifier list. Further, each of the plurality of identifier lists may be a static list of N-numbers of identifiers.

Further, in an embodiment, the computing unit 108 may be configured for obtaining at least one device information associated with the at least one device 110. Further, the at least one device information includes an indication of a network (such as an Ethernet network, a Wi-Fi network, a CDMA (Code Division Multiple Access)-based network, a GSM (Global System for Mobile Communications)-based network, a LTE (Long-Term Evolution)-based network, a 5G/4G-based network, a SATCOM (satellite communication) based network, etc.) to which the at least one device 110 may be connected. Further, the computing unit 108 may be configured for analyzing the at least one device information. Further, the computing unit 108 may be configured for determining at least one characteristic of the at least one device 110. Further, the at least one characteristic specifies the network to which the at least one device is connected. Further, the computing unit 108 may be configured for identifying the at least one identifier list from the plurality of identifier lists based on the at least one characteristic of the at least one device 110.

Further, in an embodiment, the low-observable encryption device 100 may be integrated within the at least one device 110.

FIG. 2 is a block diagram of the low-observable encryption device 100 with the at least one encryption device, in accordance with some embodiments.

FIG. 3 is a block diagram of the low-observable encryption device 100 with the at least one encryption device, in accordance with some embodiments.

FIG. 4 is a block diagram of the low-observable encryption device 100 comprising the beam steering antenna 402, in accordance with some embodiments.

Figure 5:
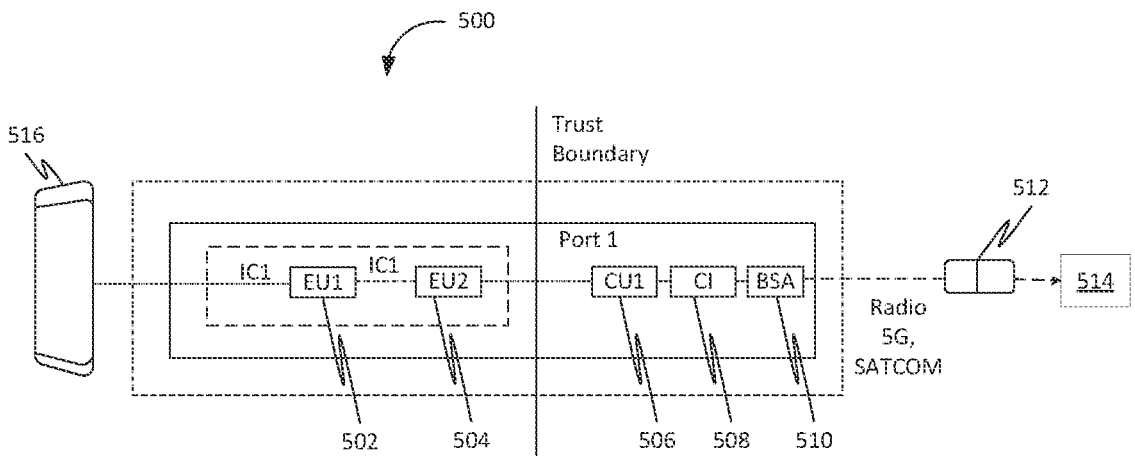
FIG. 5 is a schematic diagram of a low-observable encryption device 500 for facilitating communications, in accordance with some embodiments.

FIG. 5 is a schematic diagram of a low-observable encryption device 500 for facilitating communications, in accordance with some embodiments. Further, the low-observable encryption device 500 may include at least one encryption unit 502-504, a communication unit 506 communicatively coupled with the at least one encryption unit 502-504, a compute infrastructure 508 communicatively coupled with the communication unit 506, and a beam steering antenna 510 coupled with the compute infrastructure 508. Further, the low-observable encryption device 500 may be associated with a trust boundary dividing the low-observable encryption device 500 into a trusted environment and an untrusted environment. Further, the trusted environment is on the left of the trust boundary and the untrusted environment is on the right of the trust boundary. Further, the at least one encryption unit 502-504 is on the left of the trust boundary and the communication unit 506, the compute infrastructure 508, and the beam steering antenna 510 are on the right of the trust boundary. Further, the at least one encryption unit 502-504 may be communicatively coupled with a device (such as a smartphone, a laptop, etc.) 516 on the left of the trust boundary. Further, the compute infrastructure 508 is connected with an external encryption device (Isidore Quantum device) 512 using the beam steering antenna 510 on the right of the trust boundary via communication networks (such as Radio, 5G, SATCOM, etc.). Further, the external encryption device 514 may be communicatively coupled with at least one external device (such as a smartphone, a laptop, etc.) 514.

Figure 6:
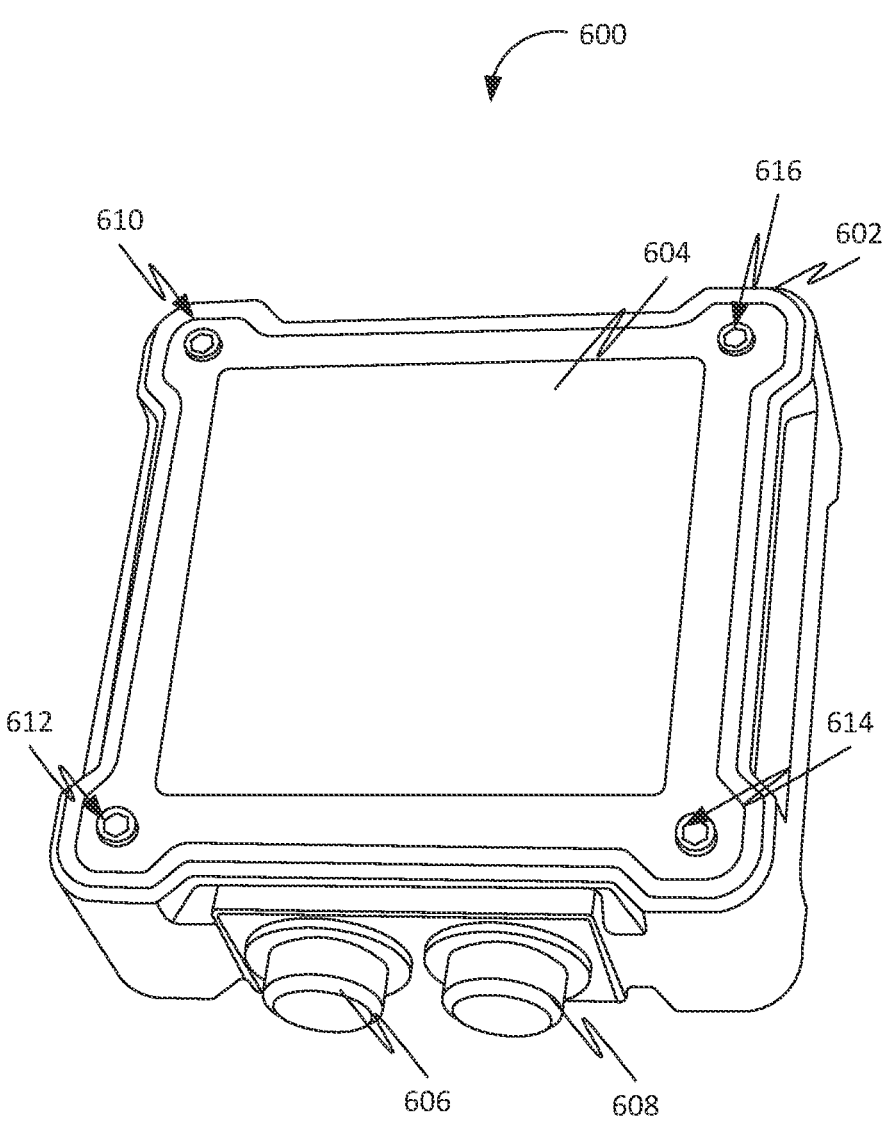
FIG. 6 is a top perspective view of a low-observable encryption device 600 for facilitating communications, in accordance with some embodiments.

FIG. 6 is a top perspective view of a low-observable encryption device 600 for facilitating communications, in accordance with some embodiments. Further, the low-observable encryption device 600 may include an outer housing 602, a name plate, 604, an inner housing 702 (as shown in FIG. 7), a beam forming phase array 704 (as shown in FIG. 7), a printed circuit board (PCB) 706 (as shown in FIG. 7), and at least one port 606-608.

Further, the outer housing 602 houses the inner housing 702 in an interior of the outer housing 602. Further, the outer housing 602 is a resin case. Further, the nameplate 604 may be disposed on an outer surface of the outer housing 602. Further, the PCB 706 may include at least one encryption unit, a communication unit, and a compute infrastructure. Further, the inner housing 702 may include a metal case. Further, the inner housing 702 houses the PCB 706 in an interior of the inner housing 702. Further, the beam forming phase array 704 may be disposed on an outer surface of the inner housing 702 and integrated with the metal case and housed within the outer housing 602. Further, the inner housing 702 with the beam forming phase array 704 forms a beam steering antenna (BSA). Further, the at least one port 606-608 provides access to the PCB 706. Further, the outer housing 602, the name plate, 604, and the inner housing 702 may be fastened using a plurality of fasteners 610-616 for securely assembling the low-observable encryption device 600. Further, the at least one port 606-608 may be fastened to the outer housing 602 using at least one additional fastener for the securely assembling of the low-observable encryption device 600.

Figure 7:
FIG. 7 is a top perspective partial cutaway view of the low-observable encryption device 600, in accordance with some embodiments.
Figure 7:
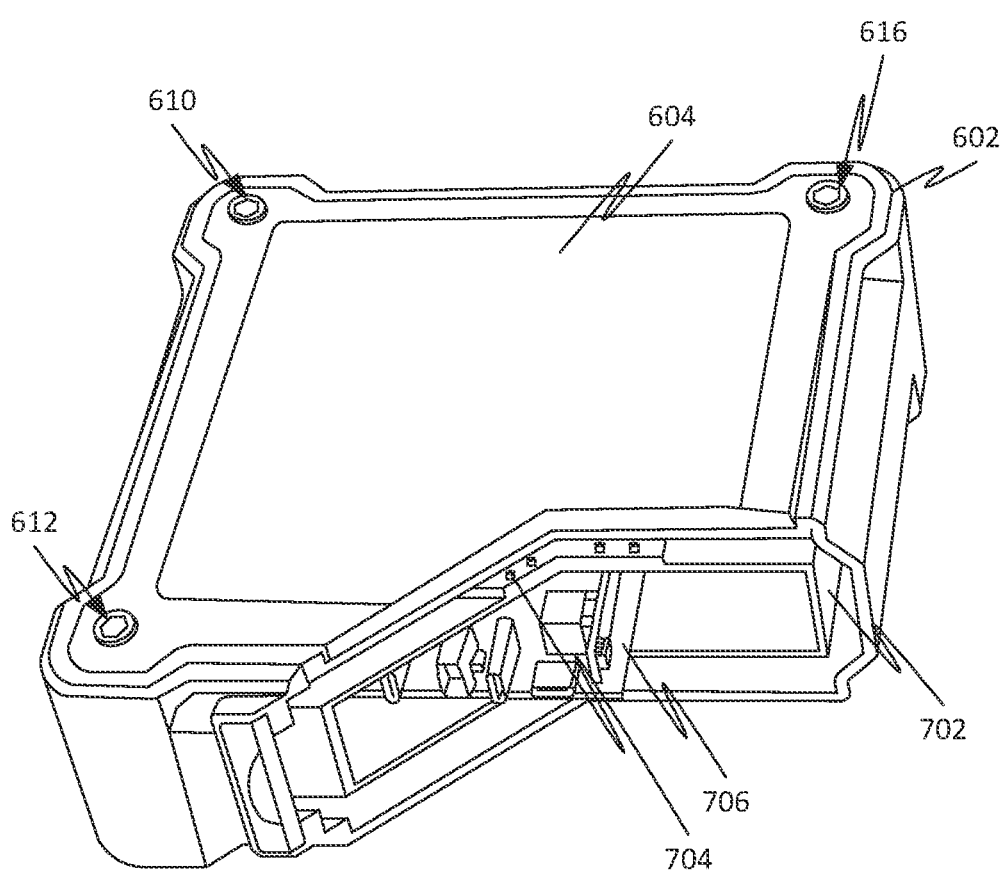

FIG. 7 is a top perspective partial cutaway view of the low-observable encryption device 600, in accordance with some embodiments.

Figure 8:
FIG. 8 is a perspective view of the interior housing 702 of the low-observable encryption device 600, in accordance with some embodiments.
Figure 8:
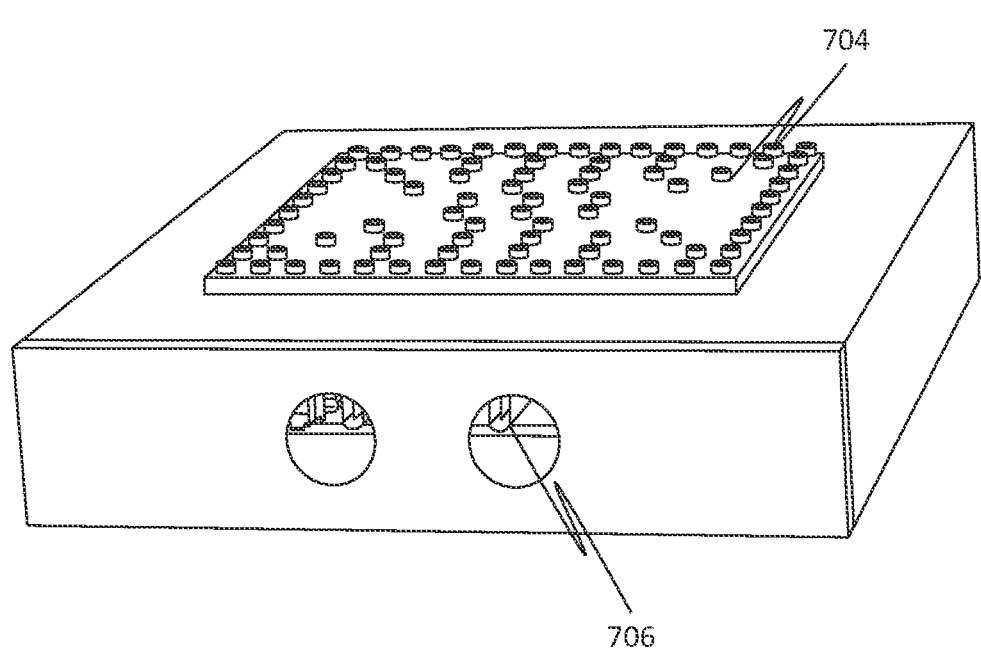

FIG. 8 is a perspective view of the interior housing 702 of the low-observable encryption device 600, in accordance with some embodiments.

Figure 9:
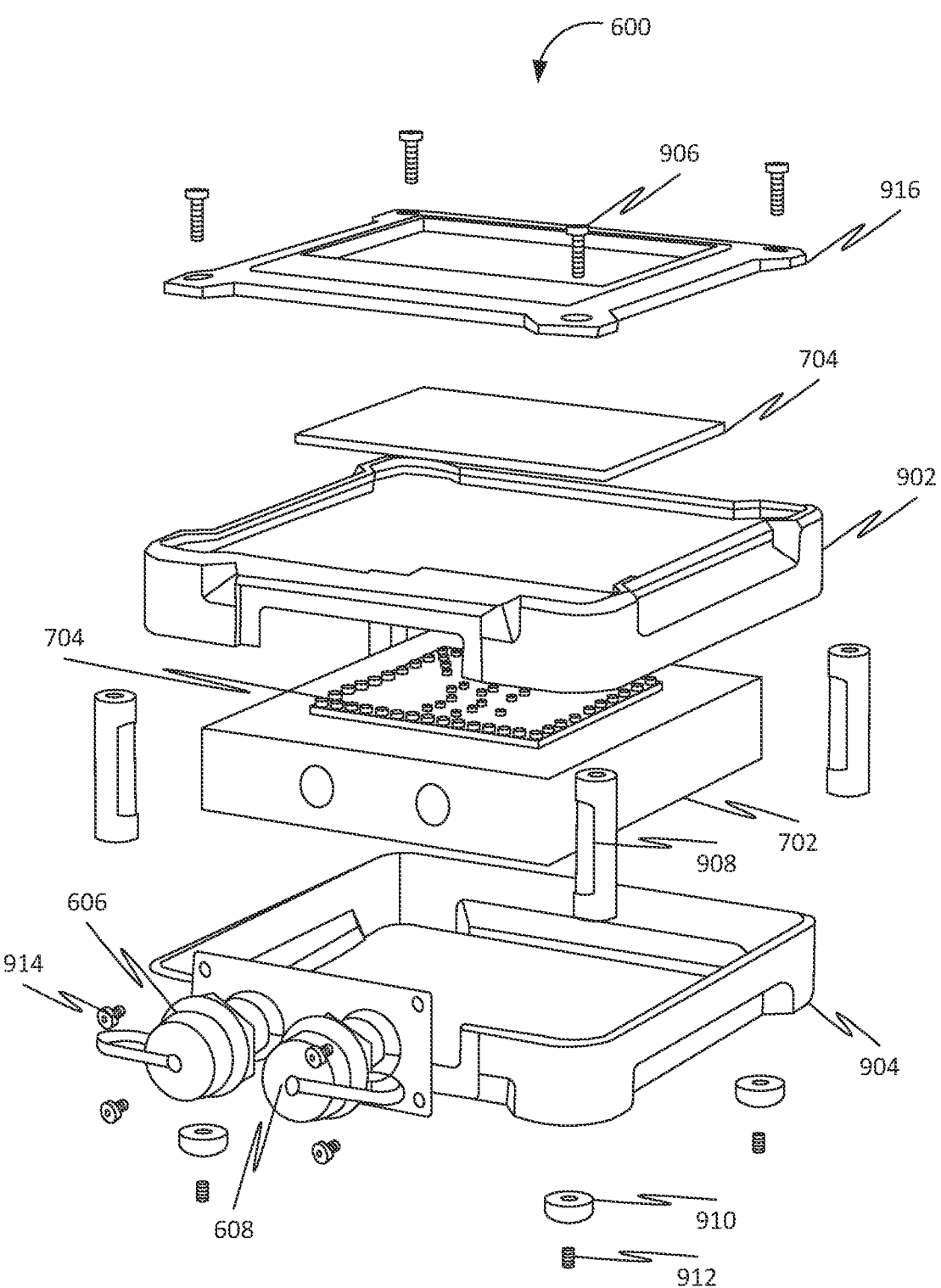
FIG. 9 is an exploded view of the low-observable encryption device 600, in accordance with some embodiments.

FIG. 9 is an exploded view of the low-observable encryption device 600, in accordance with some embodiments. Further, each of the plurality of fasteners 610-616 may include a plurality of fastening elements 906-912. Further, the outer housing 602 may include an upper portion 902 and a lower portion 904. Further, the low-observable encryption device 600 may include a securing element 916 for securing the nameplate 604 to the outer surface of the outer housing 602. Further, the at least one additional fastener may include at least one additional fastening element 914.

Figure 10:
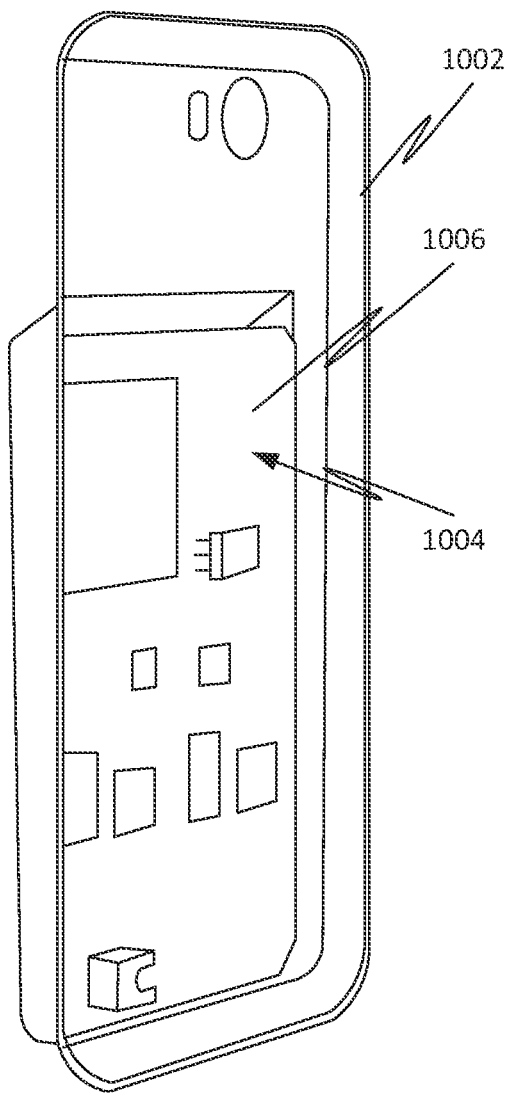
FIG. 10 is a front perspective view of a back cover 1002 comprising a low-observable encryption device 1004 for facilitating communications, in accordance with some embodiments.
Figure 12:
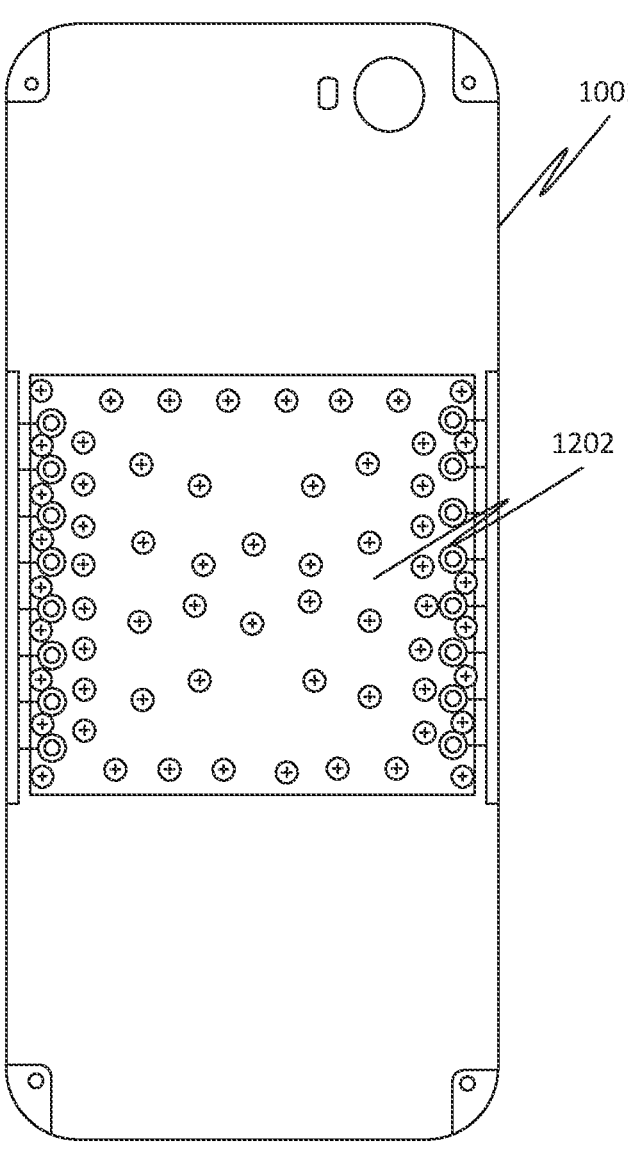
FIG. 12 is a rear view of the back cover 1102 comprising the beam steering antenna 1202 of the low-observable encryption device 1004, in accordance with some embodiments.

FIG. 10 is a front perspective view of a back cover 1002 comprising a low-observable encryption device 1004 for facilitating communications, in accordance with some embodiments. Further, the back cover 1002 may include a phone case. Further, the back cover 1002 defines an interior space for receiving the low-observable encryption device 1004 in the interior space. Further, the low-observable encryption device 1004 may include a beam steering antenna 1202 (as shown in FIG. 12) and a printed circuit board (PCB) 1006. Further, the PCB 1006 may include at least one encryption unit, a communication unit, and a compute infrastructure. Further, the beam steering antenna 1202 may include a beam forming phase array comprised on a metal case.

Figure 11:
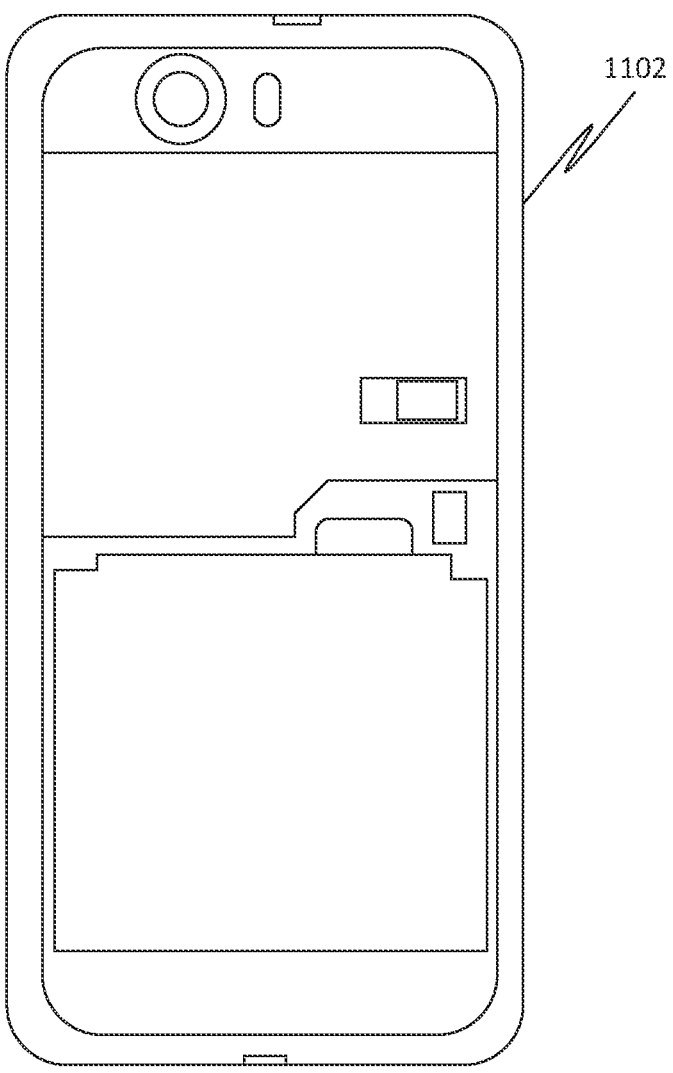
FIG. 11 is a rear view of a user device 1102 without the back cover 1002, integrable with the low-observable encryption device 1004 based on the attaching of the back cover 1002 with the user device 1102, in accordance with some embodiments.

FIG. 11 is a rear view of a user device 1102 without the back cover 1002, integrable with the low-observable encryption device 1004 based on the attaching of the back cover 1002 with the user device 1102, in accordance with some embodiments. Further, the user device 1102 may include a smartphone.

FIG. 12 is a rear view of the back cover 1102 comprising the beam steering antenna 1202 of the low-observable encryption device 1004, in accordance with some embodiments.

Figure 13:
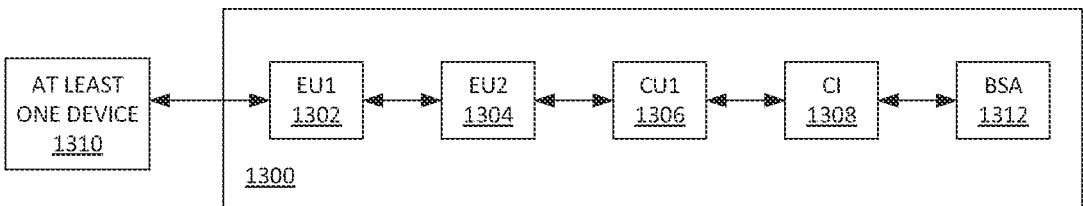
FIG. 13 is a block diagram of a low-observable encryption device 1300 for facilitating communications, in accordance with some embodiments.

FIG. 13 is a block diagram of a low-observable encryption device 1300 for facilitating communications, in accordance with some embodiments. Accordingly, the low-observable encryption device 1300 may include at least one encryption unit 1302-1304, a communication unit 1306, a computing unit 1308, and a beam steering antenna 1312.

Further, the at least one encryption unit 1302-1304 may be configured for encrypting an egressing native packet received from at least one device 1310 using at least one encryption key to create an encrypted egressing native packet. Further, the at least one encryption unit 1302-1304 may be configured for adding a connectionless header to the encrypted egressing native packet to form an egressing connectionless datagram.

Further, the communication unit 1306 may be communicatively coupled with the at least one encryption unit 1302-1304. Further, the communication unit 1306 may be configured for receiving the egressing connectionless datagram. Further, the communication unit 1306 may be configured for adding a complex header to the egressing connectionless datagram for forming an egressing packet.

Further, the computing unit 1308 may be communicatively coupled with the communication unit 1306. Further, the computing unit 1308 may be configured for establishing at least one communication session between the computing unit 1308 and at least one external computing unit of at least one external encryption device. Further, the computing unit 1308 may be configured for transmitting at least one identifier list comprising a number of identifiers in each of the at least one identifier list, and at least one identifier selecting parameter to the at least one external computing unit. Further, each of the computing unit 1308 and the at least one external computing unit may be configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device 1300 and the at least one external encryption device. Further, the computing unit 1308 may be configured for receiving the egressing packet from the communication unit 1306. Further, the computing unit 1308 may be configured for forwarding the egressing packet received from the communication unit 1306 to the at least one external computing unit of the at least one external encryption device through the path based on the identifying.

Further, the beam steering antenna 1312 may be coupled with the computing unit 1308. Further, the computing unit 1308 may be configured for determining a power and a transmission angle at an instance for a signal corresponding to the egressing packet. Further, the computing unit 1308 may be configured for generating at least one first value for at least one power control parameter associated with the beam steering antenna 1312 and at least one second value for at least one transmission angle parameter associated with the beam steering antenna 1312 based on the determining. Further, the beam steering antenna 1312 may be configured for broadcasting the signal with the power and the transmission angle at the instance based on the at least one first value of the at least one power control parameter and the at least one second value of the at least one transmission angle parameter. Further, the forwarding may be based on the broadcasting.

Further, in some embodiments, the computing unit 1308 may be further configured for receiving an ingressing packet forwarded by the at least one external computing unit, through the path during the time interval. Further, the ingressing packet may include an encrypted ingressing native packet and a complex header. Further, the communication unit 1306 may be configured for removing the complex header from the ingressing packet received from the computing unit 1308. Further, the communication unit 1306 may be configured for adding a connectionless header to the ingressing packet for forming an ingressing connectionless datagram. Further, the ingressing connectionless datagram may include the encrypted ingressing native packet. Further, the at least one encryption unit 1302-1304 may be configured for receiving the ingressing connectionless datagram. Further, the at least one encryption unit 1302-1304 may be configured for decrypting the encrypted ingressing native packet comprised in the ingressing connectionless datagram using the at least one encryption key to obtain an ingressing native packet. Further, the ingressing native packet may be transmitted to the at least one device 1310.

Further, in some embodiments, the computing unit 1308 may be configured for obtaining at least one location obfuscating information. Further, the computing unit 1308 may be configured for analyzing the at least one location obfuscating information. Further, the computing unit 1308 may be configured for determining at least one location obfuscating requirement for the low-observable encryption device 1300 based on the analyzing of the at least one location obfuscating information. Further, the determining of the power and the transmission angle at the instance may be based on the at least one location obfuscating requirement.

Further, in some embodiments, the computing unit 1308 may be configured for adding at least one of a header and a declaration associated with at least one internet standard to the egressing packet for embedding the egressing packet. Further, the forwarding of the egressing packet may be based on the embedding.

Further, in some embodiments, the computing unit 1308 may be configured for initiating a next time interval. Further, the initiating of the next time interval terminates the time interval. Further, the computing unit 1308 may be configured for selecting a next identifier from the number of identifiers comprised in each of the at least one identifier list for identifying a next path from the plurality of paths for the next time interval succeeding the time interval based on the at least one identifier list and the at least one identifier selecting parameter for the communicating of packets during the next time interval between the low-observable encryption device 1300 and the at least one external encryption device.

Further, in some embodiments, the computing unit 1308 may be further configured for storing a plurality of identifier lists. Further, the plurality of identifier lists may include the at least one identifier list.

Figure 14:
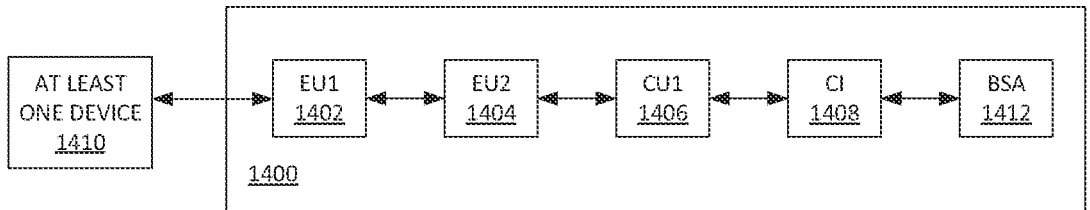
FIG. 14 is a block diagram of a low-observable encryption device 1400 for facilitating communications, in accordance with some embodiments.

FIG. 14 is a block diagram of a low-observable encryption device 1400 for facilitating communications, in accordance with some embodiments. Accordingly, the low-observable encryption device 1400 may include at least one encryption unit 1402-1404, a communication unit 1406, a computing unit 1408, and a beam steering antenna 1412.

Further, the at least one encryption unit 1402-1404 may be configured for encrypting an egressing native packet received from at least one device 1410 using at least one encryption key to create an encrypted egressing native packet. Further, the at least one encryption unit 1402-1404 may be configured for adding a connectionless header to the encrypted egressing native packet to form an egressing connectionless datagram.

Further, the communication unit 1406 may be communicatively coupled with the at least one encryption unit 1402-1404. Further, the communication unit 1406 may be configured for receiving the egressing connectionless datagram. Further, the communication unit 1406 may be configured for adding a complex header to the egressing connectionless datagram for forming an egressing packet.

Further, the computing unit 1408 may be communicatively coupled with the communication unit 1406. Further, the computing unit 1408 may be configured for establishing at least one communication session between the computing unit 1408 and at least one external computing unit of at least one external encryption device. Further, the computing unit 1408 may be configured for transmitting at least one identifier list comprising a number of identifiers in each of the at least one identifier list, and at least one identifier selecting parameter to the at least one external computing unit. Further, each of the computing unit 1408 and the at least one external computing unit may be configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device 1400 and the at least one external encryption device. Further, the computing unit 1408 may be configured for receiving the egressing packet from the communication unit 1406. Further, the computing unit 1408 may be configured for forwarding the egressing packet received from the communication unit 1406 to the at least one external computing unit of the at least one external encryption device through the path based on the identifying. Further, the computing unit 1408 may be configured for receiving an ingressing packet forwarded by the at least one external computing unit, through the path during the time interval. Further, the ingressing packet may include an encrypted ingressing native packet and a complex header. Further, the communication unit 1406 may be configured for removing the complex header from the ingressing packet received from the computing unit 1408. Further, the communication unit 1406 may be configured for adding a connectionless header to the ingressing packet for forming an ingressing connectionless datagram. Further, the ingressing connectionless datagram may include the encrypted ingressing native packet. Further, the at least one encryption unit 1402-1404 may be configured for receiving the ingressing connectionless datagram. Further, the at least one encryption unit 1402-1404 may be configured for decrypting the encrypted ingressing native packet comprised in the ingressing connectionless datagram using the at least one encryption key to obtain an ingressing native packet. Further, the ingressing native packet may be transmitted to the at least one device 1410.

Further, the beam steering antenna 1412 may be coupled with the computing unit 1408. Further, the computing unit 1408 may be configured for determining a power and a transmission angle at an instance for a signal corresponding to the egressing packet. Further, the computing unit 1408 may be configured for generating at least one first value for at least one power control parameter associated with the beam steering antenna 1412 and at least one second value for at least one transmission angle parameter associated with the beam steering antenna 1412 based on the determining. Further, the beam steering antenna 1412 may be configured for broadcasting the signal with the power and the transmission angle at the instance based on the at least one first value of the at least one power control parameter and the at least one second value of the at least one transmission angle parameter. Further, the forwarding may be based on the broadcasting.

Figure 15:
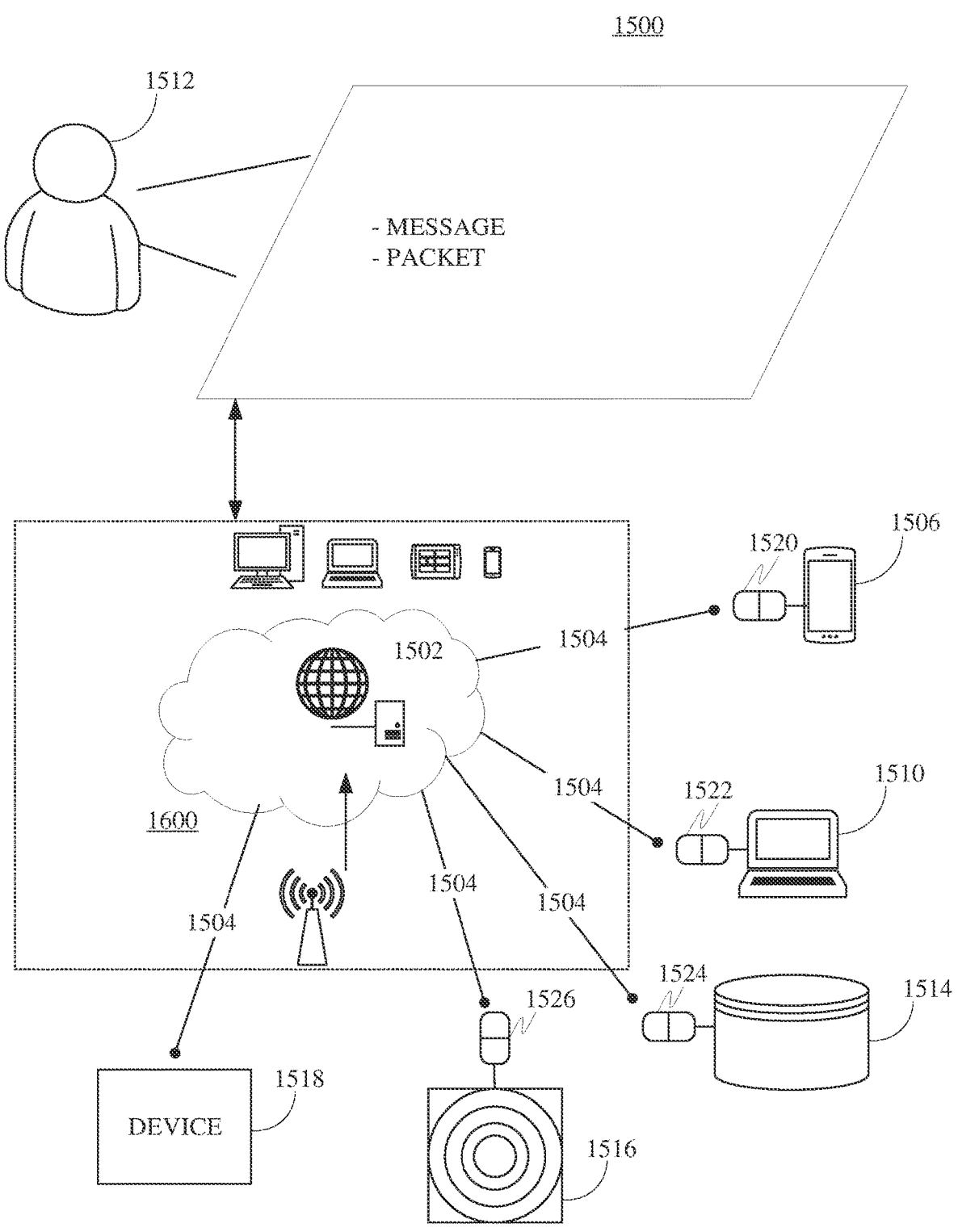
FIG. 15 is an illustration of an online platform consistent with various embodiments of the present disclosure.

FIG. 15 is an illustration of an online platform 1500 consistent with various embodiments of the present disclosure. By way of non-limiting example, the online platform 1500 to facilitate communications using a low-observable encryption device may be hosted on a centralized server 1502, such as, for example, a cloud computing service. The centralized server 1502 may communicate with other network entities, such as, for example, a mobile device 1506 (such as a smartphone, a laptop, a tablet computer, etc.), other electronic devices 1510 (such as desktop computers, server computers, etc.), databases 1514, sensors 1516, and a device 1518 (such as the low-observable encryption device) over a communication network 1504, such as, but not limited to, the Internet. Further, the mobile device 1506 may be connected with a first encryption device 1520, the electronic device 1510 may be connected with a second encryption device 1522, the databases 1514 may be connected with a third encryption device 1524, the sensors 1516 may be connected with a fourth encryption device 1526. Further, the network entities may communicate with each other using an encryption device (such as an Isidore device, an Isidore quantum device, a low-observable encryption device, etc.) connected to each network entity. Further, users of the online platform 1500 may include relevant parties such as, but not limited to, end-users, administrators, service providers, service consumers, and so on. Accordingly, in some instances, electronic devices operated by the one or more relevant parties may be in communication with the platform.

A user 1512, such as the one or more relevant parties, may access online platform 1500 through a web-based software application or browser. The web-based software application may be embodied as, for example, but not be limited to, a website, a web application, a desktop application, and a mobile application compatible with a computing device 1600.

Figure 16:
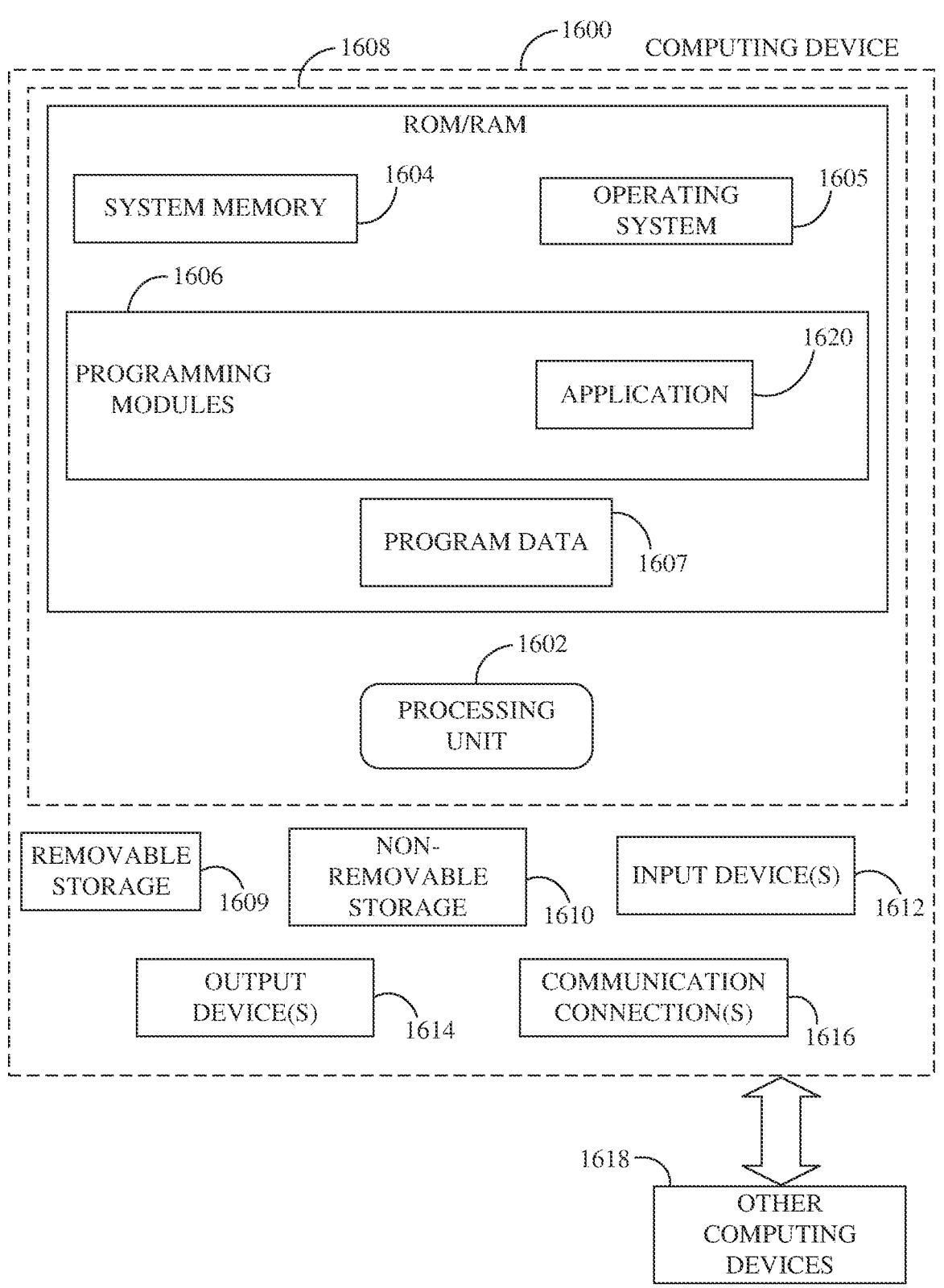
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g., random-access memory (RAM)), non-volatile (e.g., read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include machine learning module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 may perform processes including, for example, one or more stages of methods, algorithms, systems, applications, servers, databases as described above. The aforementioned process is an example, and processing unit 1602 may perform other processes.

Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A low-observable encryption device for facilitating communications, the low-observable encryption device comprising:

at least one encryption unit comprising a processor and memory storing instructions that, when executed by the processor, cause the at least one encryption unit to:

encrypt an egressing native packet received from at least one device using at least one encryption key to create an encrypted egressing native packet; and add a connectionless header to the encrypted egressing native packet to form an egressing connectionless datagram;

a communication unit communicatively coupled with the at least one encryption unit, wherein the communication unit comprises a processor and memory storing instructions that, when executed by the processor, cause the communication unit to:

receive the egressing connectionless datagram; and add a complex header to the egressing connectionless datagram for forming an egressing packet; and a computing unit communicatively coupled with the communication unit, wherein the computing unit comprises a processor and memory storing instructions that, when executed by the processor, cause the computing unit to:

establish at least one communication session between the computing unit and at least one external computing unit of at least one external encryption device;

transmit at least one identifier list comprising a number of identifiers in each of the at least one identifier list, and at least one identifier selecting parameter to the at least one external computing unit, wherein each of the computing unit and the at least one external computing unit is configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device and the at least one external encryption device;

receive the egressing packet from the communication unit; and forward the egressing packet received from the communication unit to the at least one external computing unit of the at least one external encryption device through the path based on the identifying;

initiate a next time interval, wherein the initiating of the next time interval terminates the time interval; and select a next identifier from the number of identifiers comprised in each of the at least one identifier list for identifying a next path from the plurality of paths for the next time interval succeeding the time interval based on the at least one identifier list and the at least one identifier selecting parameter for the communicating of packets during the next time interval between the low-observable encryption device and the at least one external encryption device.

2. The low-observable encryption device of claim 1, wherein the processor and memory of the computing unit further cause the computing unit to receive an ingressing packet forwarded by the at least one external computing unit, through the path during the time interval, wherein the ingressing packet comprises an encrypted ingressing native packet and a complex header, wherein processor and memory of the communication unit further cause the communication unit to:

remove the complex header from the ingressing packet received from the computing unit; and add a connectionless header to the ingressing packet for forming an ingressing connectionless datagram, wherein the ingressing connectionless datagram comprises the encrypted ingressing native packet, wherein the processor and memory of the at least one encryption unit further cause the at least one encryption unit to:

receive the ingressing connectionless datagram; and decrypt the encrypted ingressing native packet comprised in the ingressing connectionless datagram using the at least one encryption key to obtain an ingressing native packet, wherein the ingressing native packet is transmitted to the at least one device.

3. The low-observable encryption device of claim 1 further comprising a beam steering antenna coupled with the computing unit, wherein the processor and memory of the computing unit further cause the computing unit to:

determine a power and a transmission angle at an instance for a signal corresponding to the egressing packet; and generate at least one first value for at least one power control parameter associated with the beam steering antenna and at least one second value for at least one transmission angle parameter associated with the beam steering antenna based on the determining, wherein the beam steering antenna is configured for broadcasting the signal with the power and the transmission angle at the instance based on the at least one first value of the at least one power control parameter and the at least one second value of the at least one transmission angle parameter, wherein the forwarding is based on the broadcasting.

4. The low-observable encryption device of claim 3, wherein the processor and memory of the computing unit further cause the computing unit to:

obtain at least one location obfuscating information;

analyze the at least one location obfuscating information; and determine at least one location obfuscating requirement for the low-observable encryption device based on the analyzing of the at least one location obfuscating information, wherein the determining of the power and the transmission angle at the instance is based on the at least one location obfuscating requirement.

5. The low-observable encryption device of claim 1, wherein the plurality of paths corresponds to a combination of the identifier from the number of identifiers from each of the at least one identifier list, wherein each of the plurality of paths is unique.

6. The low-observable encryption device of claim 1, wherein the processor and memory of the computing unit further cause the computing unit to add at least one of a header and a declaration associated with at least one internet standard to the egressing packet for embedding the egressing packet, wherein the forwarding of the egressing packet is further based on the embedding.

7. The low-observable encryption device of claim 1, wherein the processor and memory of the computing unit further cause the computing unit to:

generate at least one packet information associated with the egressing packet based on the receiving of the egressing packet, wherein the receiving of the egressing packet by the computing unit corresponds to a behavior of the low-observable encryption device; and analyze the at least one packet information using at least one machine learning model, wherein the at least one machine learning model is trained on a plurality of historical packet information associated with a plurality of historical egressing packets received by the computing unit from the communication unit for learning a pattern of life for the low-observable encryption device, wherein the pattern of life corresponds to a normal behavior of the low-observable encryption device wherein the at least one machine learning model is configured for detecting an anomaly in the behavior in relation to the normal behavior, wherein the initiating of the next time interval is further based on the detecting of the anomaly.

8. The low-observable encryption device of claim 1, wherein the computing unit is a System on Chip (SoC).

9. The low-observable encryption device of claim 1, wherein the at least one encryption unit comprises two encryption units, wherein the two encryption units are communicatively coupled.

10. The low-observable encryption device of claim 1, wherein the at least one encryption unit is communicatively coupled to the communication via a one-way connection for providing at least one instruction to the communication unit.

11. The low-observable encryption device of claim 1, wherein the processor and memory of the computing unit further cause the computing unit to store a plurality of identifier lists, wherein the plurality of identifier lists comprises the at least one identifier list.

12. The low-observable encryption device of claim 11, wherein the processor and memory of the computing unit further cause the computing unit to:

obtain at least one device information associated with the at least one device;

analyze the at least one device information;

determine at least one characteristic of the at least one device; and identify the at least one identifier list from the plurality of identifiers list based on the at least one characteristic of the at least one device.

13. A low-observable encryption device for facilitating communications, the low-observable encryption device comprising:

at least one encryption unit comprising a processor and memory storing instructions that, when executed by the processor, cause the at least one encryption unit to:

encrypt an egressing native packet received from at least one device using at least one encryption key to create an encrypted egressing native packet; and add a connectionless header to the encrypted egressing native packet to form an egressing connectionless datagram;

a communication unit communicatively coupled with the at least one encryption unit, wherein the communication unit comprises a processor and memory storing instructions that, when executed by the processor, cause the communication unit to:

receive the egressing connectionless datagram; and add a complex header to the egressing connectionless datagram for forming an egressing packet;

a computing unit communicatively coupled with the communication unit, wherein the computing unit comprises a processor and memory storing instructions that, when executed by the processor, cause the computing unit to:

establish at least one communication session between the computing unit and at least one external computing unit of at least one external encryption device;

transmit at least one identifier list comprising a number of identifiers in each of the at least one identifier list, and at least one identifier selecting parameter to the at least one external computing unit, wherein each of the computing unit and the at least one external computing unit is configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device and the at least one external encryption device;

receive the egressing packet from the communication unit; and forward the egressing packet received from the communication unit to the at least one external computing unit of the at least one external encryption device through the path based on the identifying;

a beam steering antenna coupled with the computing unit, wherein the computing unit processor and memory further cause the computing unit to:

determine a power and a transmission angle at an instance for a signal corresponding to the egressing packet; and generate at least one first value for at least one power control parameter associated with the beam steering antenna and at least one second value for at least one transmission angle parameter associated with the beam steering antenna based on the determining, wherein the beam steering antenna is configured for broadcasting the signal with the power and the transmission angle at the instance based on the at least one first value of the at least one power control parameter and the at least one second value of the at least one transmission angle parameter, wherein the forwarding is based on the broadcasting.

14. The low-observable encryption device of claim 13, wherein the processor and memory of the computing unit further cause the computing unit to receive an ingressing packet forwarded by the at least one external computing unit, through the path during the time interval, wherein the ingressing packet comprises an encrypted ingressing native packet and a complex header, wherein the processor and memory of the communication unit further cause the communication unit to:

remove the complex header from the ingressing packet received from the computing unit; and add a connectionless header to the ingressing packet for forming an ingressing connectionless datagram, wherein the ingressing connectionless datagram comprises the encrypted ingressing native packet, wherein the processor and memory of the at least one encryption unit further cause the at least one encryption unit to:

receive the ingressing connectionless datagram; and decrypt the encrypted ingressing native packet comprised in the ingressing connectionless datagram using the at least one encryption key to obtain an ingressing native packet, wherein the ingressing native packet is transmitted to the at least one device.

15. The low-observable encryption device of claim 13, wherein the processor and memory of the computing unit further cause the computing unit to:

obtain at least one location obfuscating information;

analyze the at least one location obfuscating information; and determine at least one location obfuscating requirement for the low-observable encryption device based on the analyzing of the at least one location obfuscating information, wherein the determining of the power and the transmission angle at the instance is based on the at least one location obfuscating requirement.

16. The low-observable encryption device of claim 13, wherein the processor and memory of the computing unit further cause the computing unit to add at least one of a header and a declaration associated with at least one internet standard to the egressing packet for embedding the egressing packet, wherein the forwarding of the egressing packet is further based on the embedding.

17. The low-observable encryption device of claim 13, wherein the processor and memory of the computing unit further cause the computing unit to:

initiate a next time interval, wherein the initiating of the next time interval terminates the time interval; and select a next identifier from the number of identifiers comprised in each of the at least one identifier list for identifying a next path from the plurality of paths for the next time interval succeeding the time interval based on the at least one identifier list and the at least one identifier selecting parameter for the communicating of packets during the next time interval between the low-observable encryption device and the at least one external encryption device.

18. The low-observable encryption device of claim 13, wherein the processor and memory of the computing unit further cause the computing unit to store a plurality of identifier lists, wherein the plurality of identifier lists comprises the at least one identifier list.

19. A low-observable encryption device for facilitating communications, the low-observable encryption device comprising:

at least one encryption unit comprising a processor and memory storing instructions that, when executed by the processor, cause the at least one encryption unit to:

encrypt an egressing native packet received from at least one device using at least one encryption key to create an encrypted egressing native packet; and add a connectionless header to the encrypted egressing native packet to form an egressing connectionless datagram;

a communication unit communicatively coupled with the at least one encryption unit, wherein the communication unit comprises a processor and memory storing instructions that, when executed by the processor, cause the communication unit to:

receive the egressing connectionless datagram; and add a complex header to the egressing connectionless datagram for forming an egressing packet;

a computing unit communicatively coupled with the communication unit, wherein the computing unit comprises a processor and memory storing instructions that, when executed by the processor, cause the computing unit to:

establish at least one communication session between the computing unit and at least one external computing unit of at least one external encryption device;

transmit at least one identifier list comprising a number of identifiers in each of the at least one identifier list, and at least one identifier selecting parameter to the at least one external computing unit, wherein each of the computing unit and the at least one external computing unit is configured for selecting an identifier from the number of identifiers comprised in each of the at least one identifier list for identifying a path from a plurality of paths for a time interval based on the at least one identifier list and the at least one identifier selecting parameter for communicating packets during the time interval between the low-observable encryption device and the at least one external encryption device;

receive the egressing packet from the communication unit;

forward the egressing packet received from the communication unit to the at least one external computing unit of the at least one external encryption device through the path based on the identifying; and receive an ingressing packet forwarded by the at least one external computing unit, through the path during the time interval, wherein the ingressing packet comprises an encrypted ingressing native packet and a complex header, wherein the processor and memory of the communication unit further cause the communication unit to:

remove the complex header from the ingressing packet received from the computing unit; and add a connectionless header to the ingressing packet for forming an ingressing connectionless datagram, wherein the ingressing connectionless datagram comprises the encrypted ingressing native packet, wherein the processor and memory of the at least one encryption unit further cause the at least one encryption unit to:

receive the ingressing connectionless datagram; and decrypt the encrypted ingressing native packet comprised in the ingressing connectionless datagram using the at least one encryption key to obtain an ingressing native packet, wherein the ingressing native packet is transmitted to the at least one device; and a beam steering antenna coupled with the computing unit, wherein the computing unit processor and memory further cause the computing unit to:

determine a power and a transmission angle at an instance for a signal corresponding to the egressing packet; and generate at least one first value for at least one power control parameter associated with the beam steering antenna and at least one second value for at least one transmission angle parameter associated with the beam steering antenna based on the determining, wherein the beam steering antenna is configured for broadcasting the signal with the power and the transmission angle at the instance based on the at least one first value of the at least one power control parameter and the at least one second value of the at least one transmission angle parameter, wherein the forwarding is based on the broadcasting.

* * * * *